US007949169B2

(12) United States Patent
Bae et al.

(10) Patent No.: US 7,949,169 B2
(45) Date of Patent: May 24, 2011

(54) METHOD AND APPARATUS FOR AUTOMATED DETECTION OF TARGET STRUCTURES FROM MEDICAL IMAGES USING A 3D MORPHOLOGICAL MATCHING ALGORITHM

(76) Inventors: Kyongtae T. Bae, Pittsburgh, PA (US); Jinsung Kim, Suyong-gu (KR)

( * ) Notice: Subject to any disclaimer, the term of this patent is extended or adjusted under 35 U.S.C. 154(b) by 1136 days.

(21) Appl. No.: 10/537,514

(22) PCT Filed: Dec. 3, 2003

(86) PCT No.: PCT/US03/40148
§ 371 (c)(1),
(2), (4) Date: Nov. 16, 2006

(87) PCT Pub. No.: WO2004/049777
PCT Pub. Date: Jun. 17, 2004

(65) Prior Publication Data
US 2007/0140541 A1  Jun. 21, 2007

Related U.S. Application Data

(60) Provisional application No. 60/430,954, filed on Dec. 4, 2002.

(51) Int. Cl.
*G06K 9/00* (2006.01)
(52) U.S. Cl. ........ 382/131; 382/154; 382/132; 382/128; 382/133
(58) Field of Classification Search .......... 382/128–134, 382/154
See application file for complete search history.

(56) References Cited

U.S. PATENT DOCUMENTS

| | | | |
|---|---|---|---|
| 4,777,598 A | 10/1988 | Kellar et al. |
| 4,907,156 A | 3/1990 | Doi et al. |
| 5,133,020 A | 7/1992 | Giger et al. |
| 5,146,923 A | 9/1992 | Dhawan |
| 5,185,809 A | 2/1993 | Kennedy et al. |
| 5,319,549 A | 6/1994 | Katsuragawa et al. |
| 5,543,709 A | 8/1996 | Kajiyama |

(Continued)

FOREIGN PATENT DOCUMENTS
WO   WO 95/15536   6/1995

OTHER PUBLICATIONS

International Search Report for PCT/US03/40148 dated Jun. 18, 2004.

(Continued)

*Primary Examiner* — Wesley Tucker
(74) *Attorney, Agent, or Firm* — Thompson Coburn LLP

(57) ABSTRACT

A method for the automated detection of target structures shown in digital medical images, the method of comprising: (1) generating a three dimensional (3D) volumetric data set of a patient region within which the target structure resides from a plurality of segmented medical image slices; (2) grouping contiguous structures that are depicted in the 3D volumetric data set to create corresponding grouped structure data sets; (3) assigning each grouped structure data set to one of a plurality of detection algorithms, each detection algorithm being configured to detect a different type of target structure; and (4) processing each grouped structure data set according to its assigned detection algorithm to thereby detect whether any target structures are present in the medical images. Preferably, the target structures are pulmonary nodules, and a specialized detection algorithm is applied to image data classified as a candidate for depicting perivascular nodules. To segment perivascular nodule candidates from surrounding vessels, the image data is preferably correlated with a plurality of 3D morphological filters.

68 Claims, 8 Drawing Sheets

U.S. PATENT DOCUMENTS

| | | | |
|---|---|---|---|
| 5,583,902 | A | 12/1996 | Bae |
| 5,687,208 | A | 11/1997 | Bae et al. |
| 5,881,124 | A | 3/1999 | Giger et al. |
| 5,987,094 | A | 11/1999 | Clarke et al. |
| 6,055,985 | A | 5/2000 | Bae et al. |
| 6,240,201 | B1 | 5/2001 | Xu et al. |
| 6,466,687 | B1 | 10/2002 | Uppaluri et al. |
| 6,470,092 | B1 * | 10/2002 | Li et al. .......................... 382/132 |
| 6,470,889 | B1 | 10/2002 | Bae et al. |
| 6,609,021 | B1 | 8/2003 | Fan et al. |
| 6,635,030 | B1 | 10/2003 | Bae et al. |
| 6,678,399 | B2 | 1/2004 | Doi et al. |
| 6,866,653 | B2 | 3/2005 | Bae |
| 2002/0009215 | A1 | 1/2002 | Armato, III et al. |
| 2002/0028008 | A1 | 3/2002 | Fan et al. |
| 2003/0095696 | A1 * | 5/2003 | Reeves et al. .................. 382/131 |
| 2003/0228041 | A1 | 12/2003 | Bae et al. |
| 2004/0097875 | A1 | 5/2004 | Bae |

OTHER PUBLICATIONS

Sonka et al., "Handbook of Medical Imaging: Medical Image Processing and Analysis", Handbook, pp. 175-227, vol. 2, SPIE, Bellingham, WA.

Proceedings of the Second International Joint Conference on Pattern Recognition, Aug. 13-15, 1974, Copenhagen; IEEE, Washington, 1974, pp. 258-263, XP002023478, D. H. Ballard et al.; "Hierarchic Recognition of Tumors in Chest Radiographs".

Computer Vision Graphics and Image Processing, vol. 43, No. 2, Aug. 1988, MA US, pp. 256-264, XP000004392, S.M. Ali et al., "A New Algorithm for Extracting the Interior of Bounded Regions Based on Chain Coding".

Macq B. et al, "Lossless Compression for 3D PET", 1993 Nuclear Science Symposium and Medical Imaging Conference, San Francisco, CA, USA, Oct. 30-Nov. 6, 1993, vol. 41, No. 4, pt. 1, pp. 1556-1559, XP002181660.

Weinberger et al, "From LOCO-I to the JPEG-LS standard", Image Processing, 1999. ICIP 99. Proceedings. 1999 International Conference on Kobe, Japan Oct. 24-28, 1999, Piscataway, NJ, USA, IEEE, US Oct. 24, 1999, pp. 68-72, XP010368687.

Weinberger et al, "LOCO-I: A low complexity, context-based, lossless image compression algorithm" Data Compression Conference, IEEE Computer Society Press, Los Alamitos, CA, US, Mar. 31, 1996, pp. 140-149, XP000614253.

Young S.S. et al, "Statistically lossless image compression for CR and DR", Proceedings of the SPIE, Bellingham, VA, US, vol. 3658, Feb. 21, 1999, pp. 406-419, XP001039680.

Crawford et al.; "Computed Tomography Scanning With Simultaneous Patient Translation"; *Am. Assoc. Med. Phys.*; Nov./Dec. 1990; pp. 967-982; vol. 17(6).

Kak et al.; "Algorithms for Reconstruction with Nondiffracting Sources"; *Principles of Computerized Tomographic Imaging*; 1987; pp. 49-112; Chapter 3; The Institute of Electrical and Electronics Engineers, Inc.; New York.

Kalender et al.; "A Comparison of Conventional and Spiral CT: An Experimental Study on the Detection of Spherical Lesions"; *Journal of Computer Assisted Tomography*, Mar./Apr. 1994; pp. 167-176; vol. 18(2); Raven Press, Ltd.; New York.

Rabbani et al.; *Digital Image Compression Techniques*; 1991; pp. 1-220; vol. TT 7; Spie Optical Engineering Press; Bellingham, Washington.

FCD 14495; "Lossless and Near-Lossless Coding of Continuous Tone Still Images" (JPEG-LS); 1997; pp. 1-75; Public Draft; ISO/IEC Copyright Office; Switzerland.

Armato III et al., "Automated detection of lung nodules in CT scans: Preliminary results", Med. Phys., Aug. 2001, pp. 1552-1561, vol. 28 (8).

Bae et al., "Computer-aided Detection of Pulmonary Nodules in CT Images", Radiology, 1991, p. 144, vol. 181.

Fan et al., "Automatic Detection of Lung Nodules from Multi-Slice Low-Dose CT Images", Proc. SPIE, 2001, pp. 1828-1835, vol. 4322.

Giger et al., "Computerized Detection of Pulmonary Nodules in Computed Tomography Images", Investigative Radiology, 1994, pp. 459-465, vol. 29.

Henschke et al., "Early Lung Cancer Action Project: overall design and findings from baseline screening", The Lancet, Jul. 1999, pp. 99-105, vol. 354.

Ko et al., "Chest CT: Automated Nodule Detection and Assessment of Change over Time—Preliminary Experience", Radiology, Jan. 2001, pp. 267-273, vol. 218 (1).

Li et al., "Computer-aided diagnostic scheme for lung nodule detection in digital chest radiographs by use of a multiple-template matching technique", Med. Phys., Oct. 2001, pp. 2070-2076, vol. 28 (10).

Qian et al., "Knowledge-based Automatic Detection of Multi-type Lung Nodules from Multi-detector CT Studies", Proc. SPIE, 2002, pp. 689-697, vol. 4684.

Reeves et al., "Computer-Aided Diagnosis for Lung Cancer", Radiol Clin North Am, May 2000, 21 pages, vol. 38 (3).

Tuddenham, "Glossary of Terms for Thoracic Radiology: Recommendations of the Nomenclature Committee of the Fleischner Society", AJR, Sep. 1984, pp. 509-517, vol. 143.

* cited by examiner

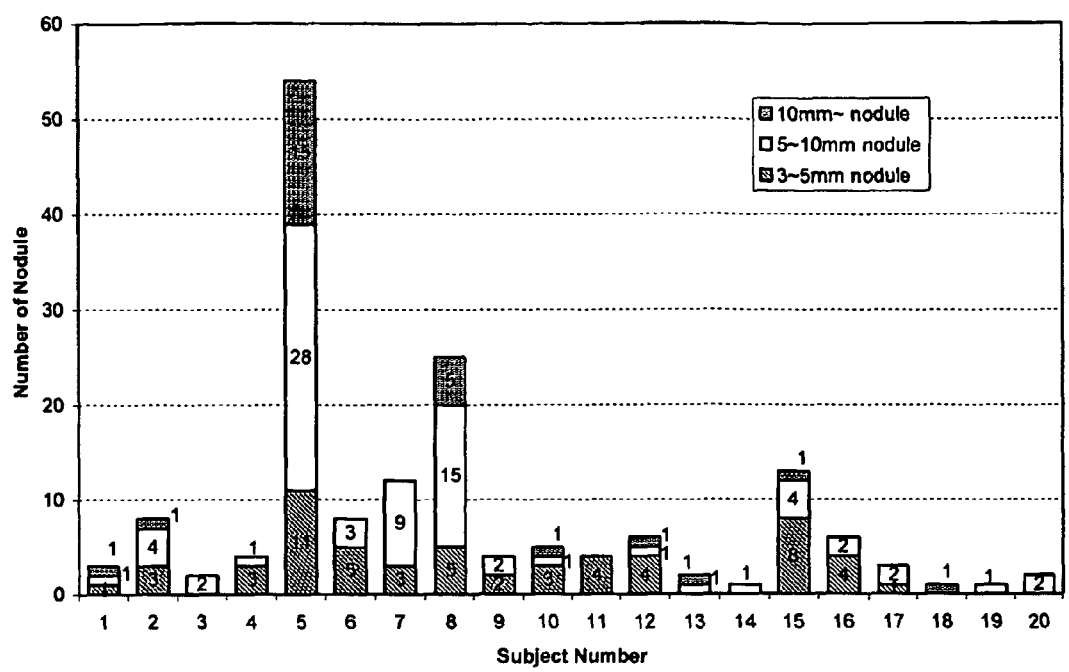
Figure 1. Bar graph showing the number and size distribution of lung nodules in 20 subjects. A total of 164 nodules were identified. Eighteen of 20 patients had 1-13 pulmonary nodules (mean 4.7), and the other 2 patients had 25 or 54 nodules in their CT.

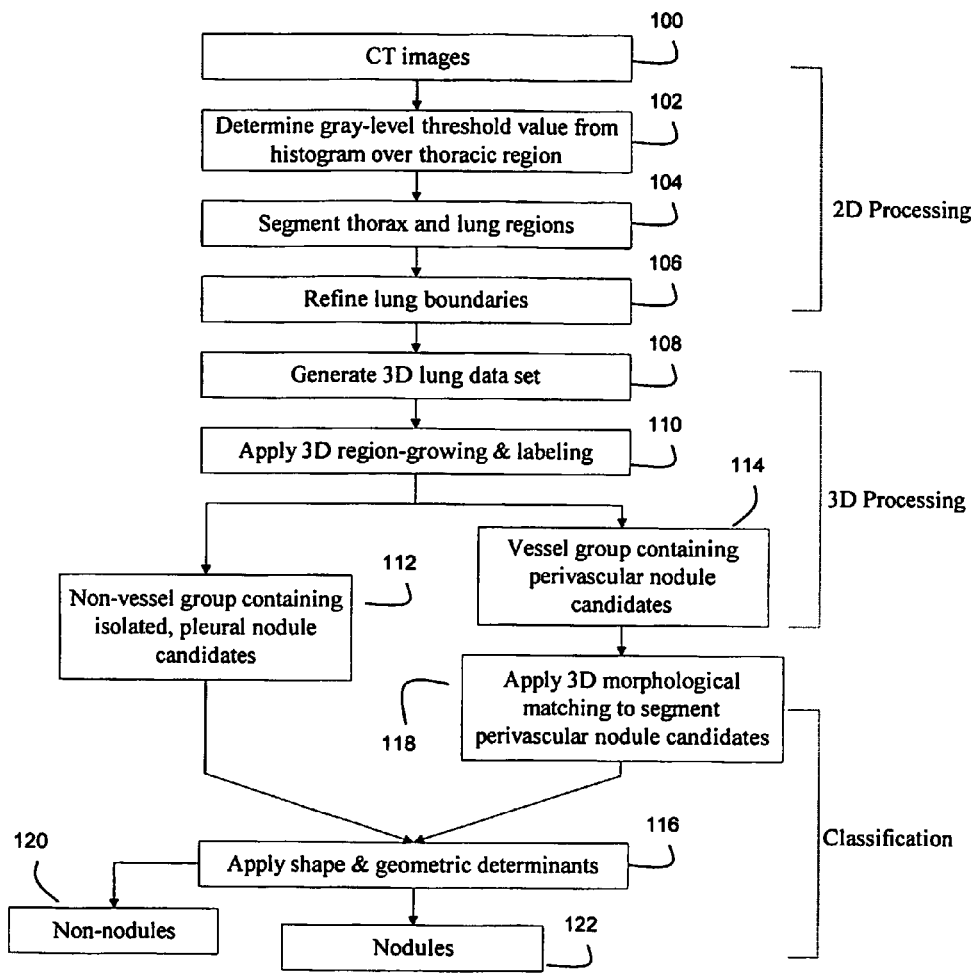
Figure 2. Flow diagram illustrating overall method for the automated lung nodule detection from CT images.

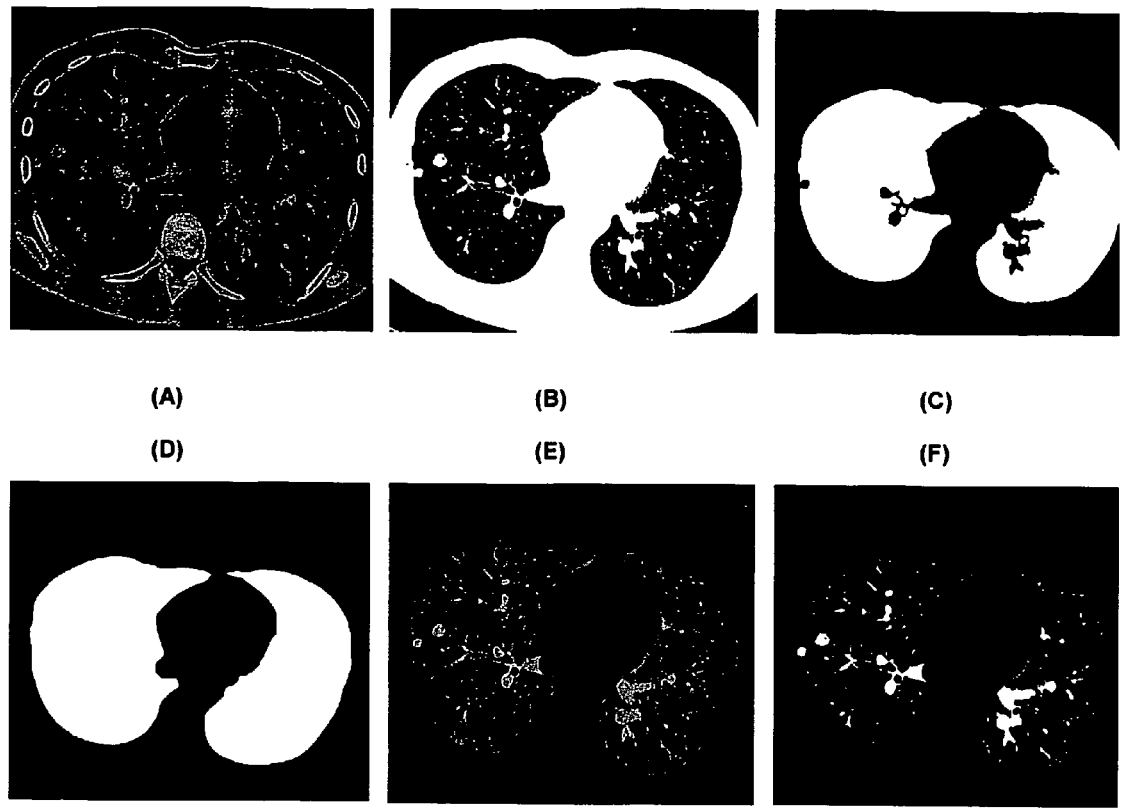

Figure 3. 2D intermediate CT images illustrating the lung region segmentation process. A transaxial CT image of the thorax from Subject 5 (Figure A) was gray-level thresholded to generate a binary image (Figure B). Initial uncorrected lung region (Figure C) was estimated. After a corrected lung boundary (Figure D) was determined, the initial CT image enclosed by this boundary was isolated (Figure E). The soft-tissue structures within the lung region were segmented by gray-level thresholding (Figure D).

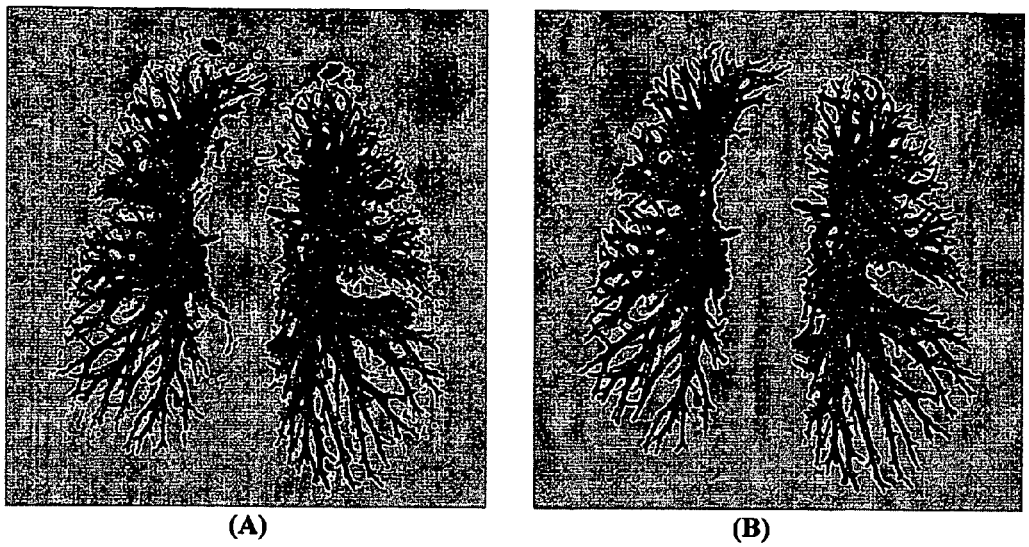

(A)           (B)

Figure 4. Segmented 3D volumetric data from Subject 15 (A) before and (B) after removing non-vessel group. Figure A was obtained by applying region-growing and labeling to a stack of 2D segmented lung images (a 2D image shown in Figure 2). This figure contains three types (isolated, pleural, and perivascular) of lung nodules, blood vessels, and noise voxels. The 3D data set in Figure B, i.e. the vessel group including perivascular nodules, represents a subset of the 3D data in Figure A after the structures not connected to the pulmonary vessels were removed.

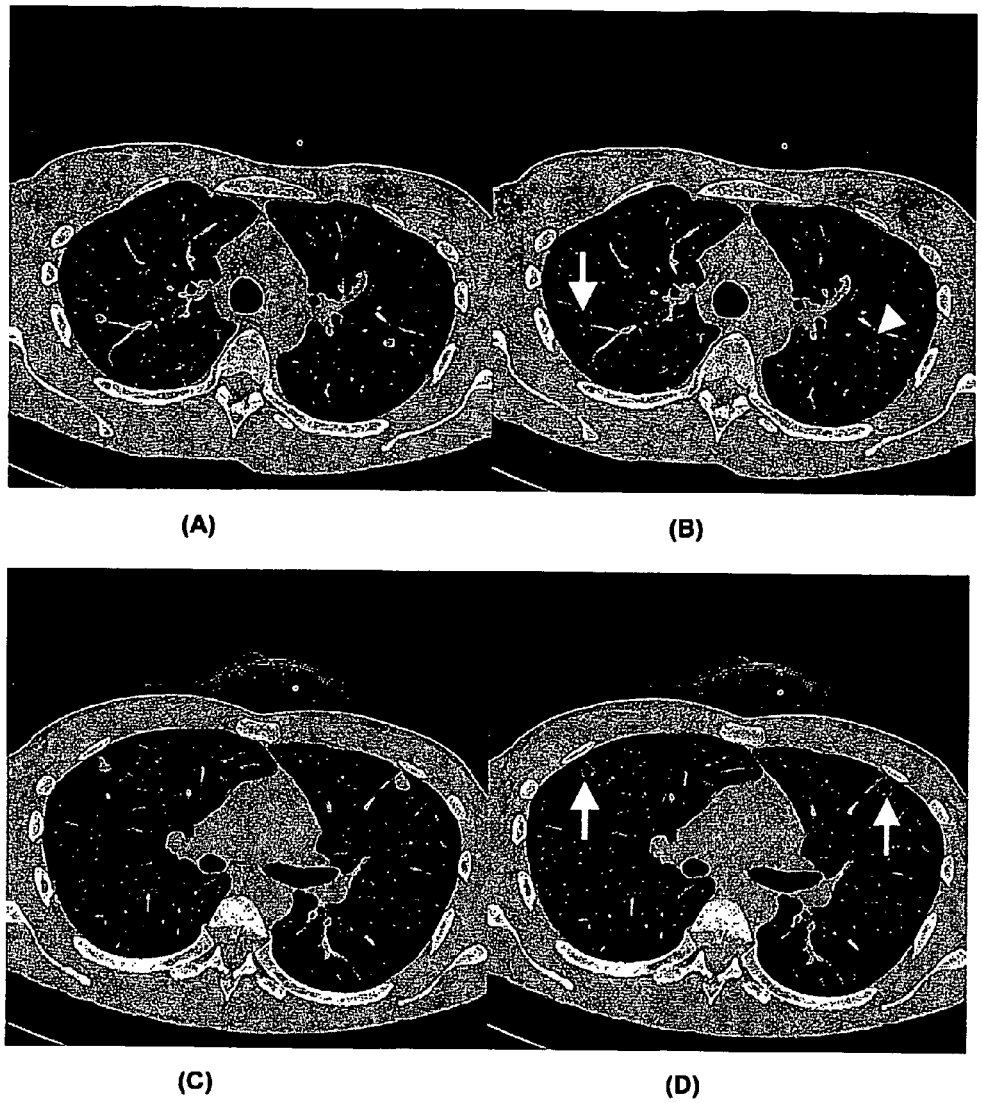
Figure 5. Transaxial CT images (A, C) with nodules detected by CAD (B, D) from Subject 5.
Figure B shows perivascular (arrow) and isolated (arrow head) nodules detected from the CT image in Figure A. Figure D shows two pleural nodules (arrows) detected from the CT image in Figure C. No false negative or false positive nodules are observed in these two CT images.

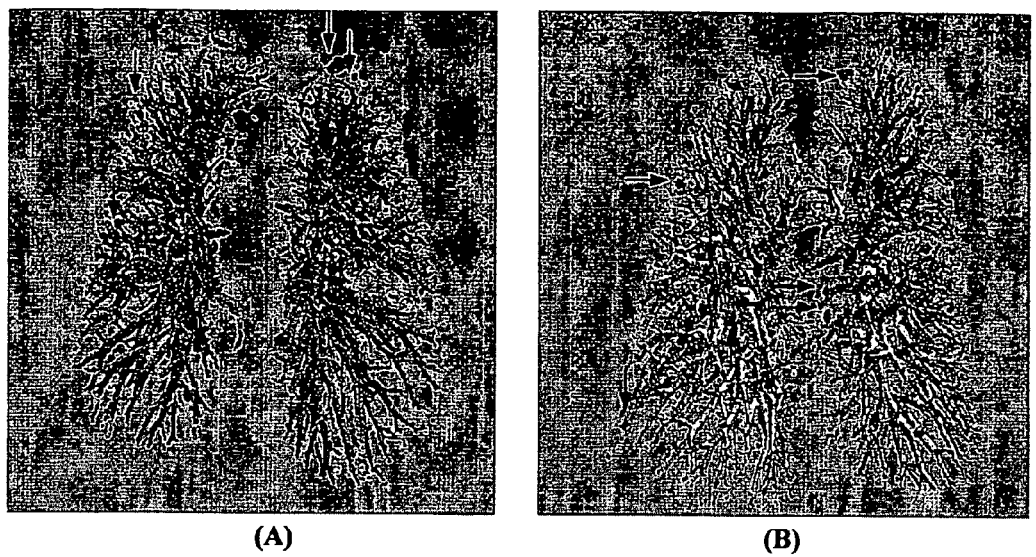
Figure 6. (A) anterior and (B) posterior views of 3D volumetric representation of pulmonary vessels and detected lung nodules (in red) from Subject 15. This subject had a total of 13 nodules (7 isolated, 3 pleural, and 3 perivascular nodules) and all of them were detected. Two false positives were identified.

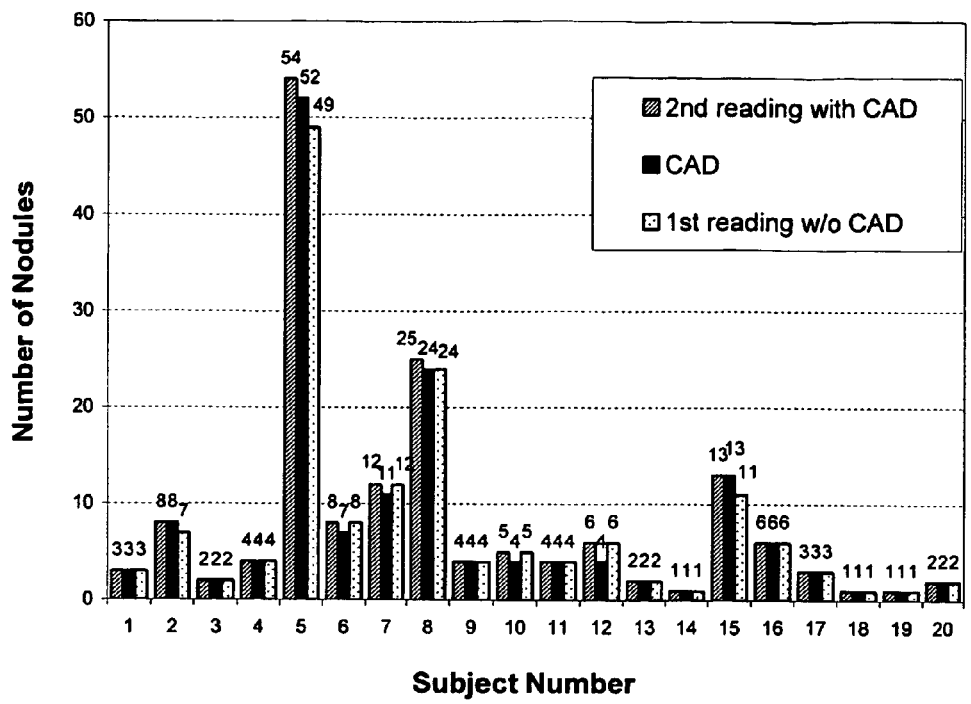
Figure 7. Bar graph showing the number of lung nodules detected by CAD and a chest radiologist (1st reading without CAD and 2nd reading with CAD) in 20 subjects. Lung nodule detection by CAD was highly accurate and better than the radiologist's 1st reading without CAD.

METHOD AND APPARATUS FOR AUTOMATED DETECTION OF TARGET STRUCTURES FROM MEDICAL IMAGES USING A 3D MORPHOLOGICAL MATCHING ALGORITHM

CROSS REFERENCE AND PRIORITY CLAIM TO RELATED APPLICATION

This application claims the benefit under 35 U.S.C. §119 (e) of provisional patent application Ser. No. 60/430,954 entitled "Method and Apparatus for Automated Detection of Pulmonary Nodules from Computed Tomography (CT) Images Using A 3D Morphological Matching Algorithm", filed Dec. 4, 2002, the disclosure of which is incorporated by reference herein.

FIELD OF THE INVENTION

The present invention relates to a system for computer-aided diagnosis (CAD) of target structures using digital medical images. In particular, the present invention relates to the application of CAD techniques to CT images to thereby automate the detection of target structures such as pulmonary nodules.

BACKGROUND OF THE INVENTION

Lung cancer is the second most commonly diagnosed cancer in the United States, and other cancers frequently metastasize to the lung parenchyma as pulmonary nodules. Chest CT is the most sensitive diagnostic imaging modality for detecting lung mass or lung nodules. With widely accepted spiral CT and newly developed multislice CT techniques, the sensitivity in detecting pulmonary nodules has further improved.

Recently, spiral CT techniques have been applied to screening for lung cancer in high risk populations, and it has been shown to be useful in the early detection of lung cancers. See Henschke et al., *Early Lung Cancer Action Project: overall design and findings from baseline screening*, Lancet; vol. 213, pages 723-26 (1999), the disclosure of which is incorporated herein by reference. High resolution, three-dimensional (3D) imaging of a patient's thorax allows for the evaluation of small nodules at early stages. With follow-up scans, any changes in nodule number and nodule size can be assessed.

High resolution CT scans of the thorax generate a large amount of data—more than 250 images with a slice thickness of 1 mm. If CT scanning becomes widely practiced for lung cancer screening, an enormous demand will exist for physicians to review and interpret the scan images. To help alleviate such a burden in a high volume screening scenario, a computer system for automated nodule detection would be useful. Moreover, CAD systems can help improve the quality of a radiologist's performance in detecting pulmonary nodules.

Various CAD systems for pulmonary nodule detection using CT images have been proposed since the introduction of the first system by one of the inventors herein more than a decade ago (see Bae et al., *Computer-aided detection of pulmonary nodules in CT images*, Radiology 1991; 181 (P): 144, the entire disclosure of which is incorporated herein by reference). The majority of these CAD systems use detection algorithms based on two-dimensional (2D) morphologic features in each slice or serial 2D methods that examine connectivity of features in adjacent slices (see Reeves and Kostis, *Computer-aided diagnosis for lung cancer*, Radiol Clin North Am 2000; 38:497-509; and Armato et al., *Automated detection of lung nodules in CT scans: preliminary results*, Med Phys 2001; 28: 1552-61, the disclosures of both of which are incorporated herein by reference). Recently, two CAD methods have been reported that focus on 3D algorithms which take advantage of high resolution volumetric CT data obtained with multislice CT systems (see Qian et al., *Knowledge-based automatic detection of multi-type lung nodules from multi-detector CT studies*, SPIE 2002; 4684: 689-697; and Fan et al., *Automatic detection of lung nodules from multi-slice low-dose CT images*, SPIE 2001; 4332: 1828-1835, the disclosures of both of which are incorporated herein by reference).

SUMMARY OF THE INVENTION

From this array of developing CAD techniques, a need in the art exists for an efficient algorithm that combines both 3D and 2D morphologic operations in the segmentation, detection, and classification of target structures. Further, different types of target structures, such as different types of pulmonary nodules, require detection algorithms specially tailored therefor to promote successful diagnosis. As such, a need in the art exists for a CAD technique that has the capability of identifying which image regions should undergo different detection processing and further has the capability of performing the different detection processing on the identified regions. For example, in the detection of pulmonary nodules, different types of pulmonary nodules have unique characteristics that make separate processing thereof important for successful diagnosis. The three types of pulmonary nodules of interest are isolated nodules, perivascular nodules, and pleural nodules.

Isolated nodules are nodules that are dissimilar to adjacent blood vessels. Isolated nodules exhibit relatively high contrast with the surrounding lung, and as such, can be easily recognized in a 2D slice without comparing adjacent slices.

However, perivascular nodules are not easily differentiated from the nearby blood vessels because they are closely associated with adjacent blood vessels and because some blood vessels that are perpendicular to the imaging plane exhibit a similar appearance as perivascular nodules in 2D slices. As such, comparison between adjacent slices (i.e., 3D operation) may be essential to the successful detection of perivascular lung nodules. It should be noted that the term "perivascular nodules" as used herein encompasses juxtavascular nodules.

Pleural nodules, which are pulmonary nodules attached to the pleural surface, may be easily detected in a 2D slice by the human eye. However, an additional operation is generally required to properly delineate them from the pleural boundary.

In an effort to develop an efficient technique capable of accurately detecting target structures such as pulmonary nodules, the inventors herein have developed a method for automated detection of target structures shown in digital medical images, the method comprising: (a) generating a three dimensional (3D) volumetric data set of a patient region within which the target structures reside from a plurality of segmented medical image slices; (b) grouping contiguous structures that are depicted in the 3D volumetric data set to create corresponding grouped structure data sets; (c) assigning each grouped structure data set to one of a plurality of detection algorithms, each detection algorithm being configured to detect a different type of target structure; and (d) processing each grouped structure data set according to its assigned detection algorithm to thereby detect whether any target structures are present in the medical images.

When used to detect pulmonary nodules, wherein the patient region being imaged is a region that includes a plurality of vessels, the method may further comprise classifying each grouped structure data set as either a vessel group data set or a non-vessel group data set, and wherein the assigning step comprises assigning each vessel group data set to a first detection algorithm and assigning each non-vessel group data set to a second detection algorithm. Further still, the processing step may comprise: (1) for each non-vessel group data set, determining a target structure status for the structure depicted therein based on geometric criteria; and (2) for each vessel group data set, (i) convolving the vessel group data set with at least one predetermined 3D morphological filter to thereby compute a correlation value between the vessel group data set and the 3D morphological filter, (ii) selecting a vessel group data set or subset thereof if its correlation value is within a predetermined range, and (iii) determining a target structure status for the structure depicted in the selected data set based on geometric criteria.

While in the preferred embodiment the invention is practiced using CT images of a patient's lung region wherein the target structures are pulmonary nodules, it should be understood that the scope of the present invention extends in application to different imaging techniques such as magnetic resonance (MR) and ultrasound as well as different bodily areas. For example, the technique of the present invention may be used to detect bodily conditions other than pulmonary nodules such as colon polyps, aneurysms (both brain and otherwise), and a variety of other conditions.

By classifying 3D structures found in the image data into different groups, the present invention allows for the particularized detection techniques to be applied to each group, wherein each detection technique is optimized to the specifics of its group. For example, because accurate detection of perivascular nodules in a patient's lung region requires a more strenuous analysis than does detection of isolated nodules or pleural nodules, the present invention allows application of the more rigorous detection algorithm to the perivascular nodule candidates while providing application of the simpler detection algorithm to the other nodule candidates. Such a bifurcated approach preserves computing power and represents an efficient approach to CAD.

Also, by application of 3D morphological filters to candidate structures that may include perivascular nodules, the present invention allows for a level of automated detection of perivascular nodules that, to the inventors' knowledge, has previously been unattainable.

As would be appreciated by those having ordinary skill in the art upon review of the teachings herein, the present invention can be implemented in software, hardware, or some combination thereof.

These and other features and advantages of the present invention are set forth below and in the enclosed figures.

BRIEF DESCRIPTION OF THE DRAWINGS

FIG. 1 is a bar graph depicting the number and size distribution of lung nodules in 20 patients;

FIG. 2 is a flowchart depicting the process of the preferred embodiment of the present invention;

FIGS. 3(A)-(F) depict CT thorax images after various stages of thresholding and segmentation;

FIGS. 4(A)-(B) depict 3D volumetric data for subject 15 before and after removal of the non-vessel group data;

FIGS. 5(A)-(D) depict CT images and the detection of nodules therein;

FIGS. 6(A)-(B) depict anterior and posterior views of the 3D volumetric representation if pulmonary vessels and detected lung nodules;

FIG. 7 is a bar graph depicting a comparison of the lung nodules detected by the present invention, by a chest radiologist without the benefit of a CAD technique, and by a chest radiologist with the benefit of a CAD technique.

DETAILED DESCRIPTION OF THE PREFERRED EMBODIMENT

Figure 8:
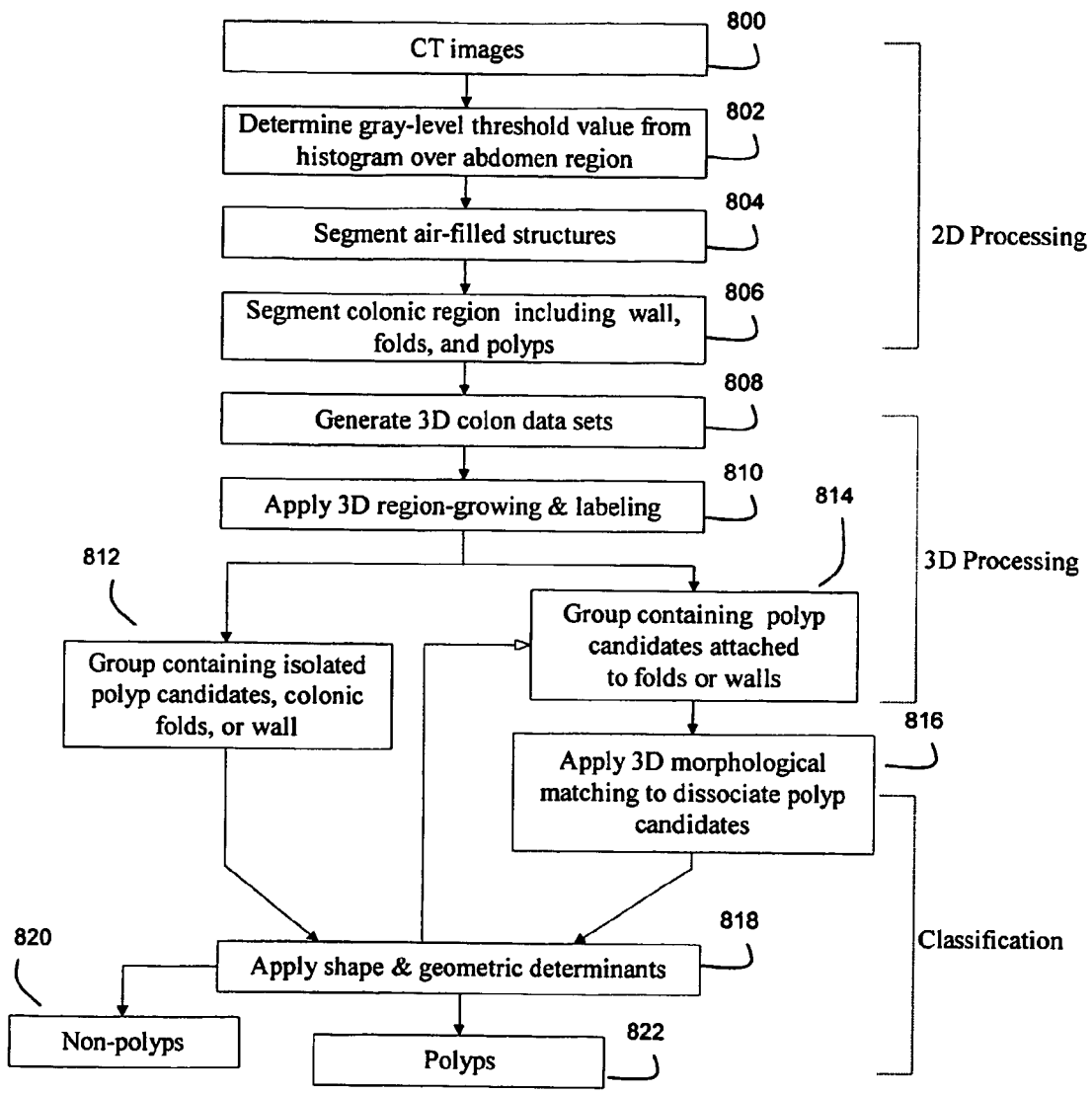
FIG. 8 is a flowchart depicting the process of a colon polyp detection embodiment of the present invention.

The lung nodule detection algorithm of the preferred embodiment is a combination of 2D and 3D operations. While the 3D operation is more general and more powerful, in some image processing steps the 2D operation is preferred because it is more efficient and easier to implement. The combined 2D/3D approach of the preferred embodiment represents an efficient technique for pulmonary nodule detection and may be used by radiologists when the CT images are reviewed for the presence of lung nodules.

The CT images may be generated by a CT scanner as is well known in the art. The generated CT images are preferably electronically transferred from the scanner to a computer such as a PC workstation. The automated detection algorithm of the preferred embodiment is then executed on the CT image data by software.

In testing the preferred embodiment, a database of 20 diagnostic thoracic CT scans from 20 patients (13 men, 7 women; age range of 40-75 years with a mean age of 57 years) was used. These patients were consecutively identified by retrospectively reviewing a selecting clinical chest CT studies performed with a multislice CT scanner (a Plus 4 Volume Zoom scanner manufactured by Siemens Medical of Erlangen, Germany). The CT images were acquired with a spiral scanning technique using scan parameters of 120 KvP, 120 effective mAs, a 0.5 s scan, 4×1 mm collimation, a standard high resolution lung kernel, 1 mm slice thickness, and a 1 mm reconstruction interval. Each image slice has a matrix size of 512×512 pixels with in-plane resolutions ranging from 0.55 mm to 0.7 mm.

The 20 scans in the database together comprise a total of 5,294 images, with the number of images per scan ranging from 201 to 341 (with a mean of 265 images per scan). A total of 164 nodules were identified in the images by a chest radiologist who reviewed the CT images twice, with and without CAD results. The second reading of the CT images with CAD was conducted three weeks after the first reading (conducted without CAD) to ensure that no memory of the first reading would affect the second reading. Eighteen of the 20 patients had 1-13 pulmonary nodules (mean of 4.7), and the other two patients showed 25 and 54 nodules in their CT images. Several small nodules that were overlooked in the initial review were detected in the second review that was aided by CAD results. The results from these combined reviews were used as the gold standard to which the results of the preferred embodiment are compared. FIG. 1 illustrates detailed number and size distributions of the pulmonary nodules for each subject. The number of nodules by size distribution was as follows: there were 27 nodules greater than 10 mm in diameter, there were 80 nodules within the diameter range of 5-10 mm, and there were 57 nodules within the diameter range of 3-5 mm.

The PC workstation used in testing the preferred embodiment possessed 384 MB and Pentium III, 450 MHz processing. The software was implemented using MATLAB software, manufactured by The MathWorks, Inc. of Natick, Mass. However, as should be understood by those of ordinary skill in the art, other processors may be used to carry out the processing tasks of the algorithm. Further still, it should be noted that these processing tasks can be performed in a distributed manner. As such, when the term "processor" is used herein, it encompasses not only a single processor that is configured to perform all tasks of the algorithm but also distributed processors, wherein each carries out at least a portion of the processing load for the algorithm.

FIG. 2 illustrates the preferred algorithm of the present invention. When steps 100-106 of FIG. 2 are performed in the 2D realm (slice by slice) and steps 108-116 are performed in the 3D (volumetric) realm, it should be understood that the 2D steps could also be performed in the 3D volumetric realm.

Similarly, it should be understood that the 3D steps can be performed in the 2D realm. In such a case, step 108 could be eliminated and steps 110-116 would be performed in a slice-by-slice mode. Nodule candidates would be evaluated for 2D geometric criteria, and candidates between adjacent slices would be compared and merged if those candidates satisfy a defined connectivity criteria. Further, classification would be preferably based on each nodule candidate's 2D features. Further still, it should be understood that individual ones of steps 110-116 can be performed in a 2D slice-by-slice mode rather than a 3D mode if desired by a practitioner of the invention.

At step 100, CT images are generated by a scanner and received by a workstation executing software that implements the present invention. In the example described above, the CT image data that was initially acquired at 16-bit gray-scale resolution was reduced to 8-bits to improve computing power. However, as would be understood by those of ordinary skill in the art, the present invention may also be implemented without such data reduction.

The thorax's representation in the CT image slices can be easily delineated from background air because of its high tissue-to-air contrast. For this same reason, the lung's representation in the CT image slices can also be distinctly separated from its surrounding soft tissues or bony tissues. Gray-level thresholding methods, which are known in the art, were used to create binary images and thereafter to detect the boundary of the thorax and lung regions (see the Armato article discussed above and also Giger et al., *Computerized Detection of Pulmonary Nodules in Computed Tomography Images*, Investigative Radiology 1994; 29: 459-65; Ko et al., *Chest CT: automated nodule detection and assessment of change over time—preliminary experience*, Radiology 2001; 218: 267-73; and Li et al., *Computer-aided diagnostic scheme for lung nodule detection in digital chest radiographs by use of a multiple-template matching technique*, Med Phys 2001; 28: 2070-76, the disclosures of all of which are incorporated herein by reference).

The threshold value may be determined from any of a variety of techniques. For example, a non-exhaustive list of techniques would include: (1) being determined from a fixed attenuation value, (2) being determined from an analysis of an image attenuation profile, or (3) being determined from an analysis of a 2D or 3D region histogram. With the preferred embodiment, segmentation of the thorax and lung region (step 104) was based on a thresholding method applied to each image slice with the threshold being determined by analysis of the 2D region histogram which showed distinct groups of pixels belonging to the thorax and background air (step 102). The thoracic region was segmented from the thresholded binary image. Background pixels representing the air outside the thorax were clipped, and the morphological operations of erosion and dilation were applied to eliminate scattered background. A new gray-level histogram was acquired from the pixels in the entire thoracic region, and the threshold value for lung segmentation was determined to maximize the separation between two major peaks in the histogram. These boundary detection processes were repeated on the segmented thorax region to segment the lung region.

The lung boundary detected by the gray-level thresholding technique often does not include pleural nodules because these nodules are contiguous with the body wall, and as such, are segmented as part of the body wall rather than the lung region. Further, central pulmonary vessels which may have perivascular nodules attached thereto may be excluded from the segmented lung region. To correct such segmentation shortcomings, a morphological operation as described in the Armato et al. paper and in Sonka and Fitzpatrick, *Handbook of Medical Imaging: Medical Image Processing and Analysis*, Vol. 2, SPIE, Bellingham, Wash. 2000 (the entire disclosure of which is incorporated herein by reference) is used to refine the lung boundary (step 106). Circular "closing" filters of variable diameters are iteratively applied to the segmented lung region to capture the pleural nodules and to contain central pulmonary vessels.

FIG. 3 illustrates the results of the lung region segmentation process including lung boundary refinement. FIG. 3(A) shows a transaxial CT image of the thorax from Subject 5 (see FIG. 1). The image of FIG. 3(A) was gray-level thresholded to generate a binary image as shown in FIG. 3(B). An initial uncorrected lung region was estimated as shown in FIG. 3(C). After lung boundary refinement, the image shown in FIG. 3(D) was created. The initial CT image that is enclosed by the lung boundary of FIG. 3(D) is shown in FIG. 3(E). FIG. 3(F) shows the soft-tissue structures within the lung region that were segmented by gray-level thresholding. The final segmented lung region contains the three types of lung nodules (isolated, pleural, and perivascular), blood vessels, pulmonary parenchyma, airway, and mediastinal structures.

Once the boundary of the lung region has been refined, the 2D segmented lung regions are stacked to generate a 3D volumetric data set of the lung region (step 108). At step 110, region growing is applied to the 3D data set to group contiguous structures in three dimensions using a predetermined degree of connectivity. Preferably, 18-connectivity is applied to the voxels of the 3D data set, as testing has shown it to provide better image quality than lower connectivity (6-connectivity) and no significant differences in quality than higher connectivity (26-connectivity). The volume of each grouped structure was computed by counting the number of connected voxels and converting that number into $mm^3$. FIG. 4(A) depicts a resulting volumetric data set created from a stack of 2D segmented lung images. This figure contains the above-described three types of nodules as well as blood vessels and noise voxels.

Step 110 also encompasses classification or labeling of each grouped structure in the 3D data set as either part of a vessel group data set or a non-vessel group data set. Vessel group and non-vessel group data sets can be readily differentiated by criteria such as size and anatomical location. Vessel groups are much larger, more central, and more craniocaudally elongated than non-vessel groups. The vessel group data set corresponds to the pulmonary vessel tree (which is the largest connected structure in each lung) and includes any perivascular nodules that are attached thereto. The non-vessel group data set corresponds to remaining soft tissue structures, including both isolated nodules and pleural nodules. The non-vessel group data set is shown representationally by box 112 in FIG. 2 while the vessel group data set is shown representationally by box 114. FIG. 4(B) depicts the vessel group structures (which includes perivascular nodules) which is a subset of the structures shown in FIG. 4(A)—(the structures not connected to the pulmonary vessels having been removed in FIG. 4(B)).

Detection of isolated nodules and pleural nodules within the non-vessel group data set occurs at step 116. The nodule status of the structures in the non-vessel group data set is determined on the basis of geometric criteria. Further, it is preferred that the geometric criteria be used to identify non-nodule structures rather than be used to identify nodule structures. The inventors have found that a "filtering out non-nodules" approach is more efficient in implementation than a "filtering in nodules" approach. The three preferred geometric criteria are size, compactness, and elongation.

The upper size limit for a nodule can safely be defined as 3 cm in diameter (see Tuddenham, *Glossary of terms for thoracic radiology: recommendations of the Nomenclature Committee of the Fleischner Society*, AJR 1984, 143: 509-17, the disclosure of which is incorporated herein by reference). Thus, a structure whose volume is greater than 14.14 cm$^3$ (which equals $(4/3)*\pi*(1.5)^3$) can be deemed a non-nodule. The lower size limit for a nodule can be safely defined as 3 mm in diameter (or 14.14 mm$^3$ in volume). Using these volume limits as range thresholds, the structures in the vessel group data set can have their nodule status assessed on the basis of their calculated volumes. However, as should be understood to those of ordinary skill in the art, other upper and lower size limits may be used in the practice of the present invention depending upon the level of precision desired by the practitioner of the invention.

In addition to their general size, nodules are typically compact. As such, compactness is also preferably used as a geometric criteria for assessing nodule status. The compactness of each candidate structure is preferably computed as the ratio of its volume to the volume of the smallest 3D box that encloses the candidate structure (defined as the compactness value). A candidate structure whose compactness value is less than 0.5 or greater than 1.5 is deemed a non-nodule.

Lastly, nodules are typical spherical while lung vessels are typically elongated. Therefore, in addition to size and compactness, elongation may also be used to determine nodule status. In doing so, an elongation factor is computed for each candidate structure in both 2D and 3D. The 2D elongation factor is preferably computed as the distance ratio of the major axis to the minor axis of a rectangle/ellipse enclosing the candidate. The 3D elongation factor is preferably computed as the ratio of the maximum to the minimum eigenvalues from the coordinates of the candidate structure's voxels. For relatively round or spherical structures, the elongation factor is close to 1. In the preferred embodiment, a candidate structure having an elongation factor greater than 3 is determined to be a non-nodule. Preferably, candidate structures are compared first against the 2D elongation factor and any surviving candidates are compared against the 3D elongation factor, which preserves computation time (the 3D elongation processing requires more computational time, and by first passing candidates through the 2D elongation test, several candidates can be discarded and avoid the 3D elongation test entirely). However, it should be noted that the present invention may be practiced wherein only the 3D elongation test is used.

As a result of this geometric processing, any candidate structures that were not excluded by size, compactness, or elongation constraints are classified as nodules.

Detection of perivascular nodules within the vessel group data set presents a more challenging problem. While perivascular nodules are distinguished morphologically from vessels on the basis of their generally spherical shape (vessels are more elongated), detection can be troublesome because the perivascular nodules are attached to the pulmonary vessels. Unless they are disassociated from their attached vessels, the shape and geometric features of perivascular nodules cannot be independently characterized, which is to say, direct application of the geometric criteria of step 116 is ineffective to identify perivascular nodules.

The present invention (at step 118) uses a 3D multi-level morphological matching method to identify and extract perivascular nodule candidates from the vessel group structures. In this process, 3D morphological filters are used. Each filter defines a volume of pixels in a specified shape. These filters preferably are spherical in shape. However, it should be noted that more complex shapes may be used for matching with candidate structures. Further, while a single filter may be used in the matching process, it is preferred that a candidate structure be matched against a plurality of different filters, with each filter being "tuned" to a different expected nodule shape. In the preferred embodiment, four different sizes of spherical filters (3, 6, 9, and 12 mm in diameter) are used to identify nodule candidates ranging from 3-30 mm. Candidate structures can be matched against the filters either in parallel or in a series as desired by the practitioner of the invention. While the tested embodiment used the filters in series, it is envisioned that improvements in efficiency may be obtained through parallel processing of filters.

Although the 3 mm filter was the most sensitive of the four and was able to detect nodule candidates larger than 3 mm in diameter, the use of the other filters helped the identification of nodule candidates that were subject to high variability in pulmonary vessel thickness in different lung regions. Each filter was particularly sensitive in detecting nodule candidates whose diameters were close to that of the designated filter size. While increasing the number of filters improved the sensitivity of detecting nodule candidates, such an increase also increased computation time and the detection of false positive nodule candidates. Thus, as would be understood by those of ordinary skill in the art, a trade-off exists when selecting the number of morphological filters and more or fewer than four filters may be used depending upon the needs of the situation at hand.

The morphological filters are convolved with the 3D data of the vessel group data set to compute a correlation value. High correlation indicates a close match in the shape of the target candidate and the shape of the filter. The correlation value between the 3D vessel group data set (I) and the morphological filter (F) can be expressed in terms of the Fast Fourier Transform (FFT) method:

$$(I * F)(t) = \sum I(t) \cdot F(x-t) = $$

$$\frac{1}{n_i n_f} \sum_{x=0}^{n-1} I(u_i) \cdot \exp(2\pi i u_i x / n_i) \cdot F(u_f) \cdot \exp(2\pi i u_f (t-x)/n_f)$$

wherein $u_i$ is the $i^{th}$ voxel in the vessel group data set I, wherein the value $u_f$ is the $f^{th}$ voxel in the morphological filter F, wherein the values $n_i$ and $n_f$ are the number of voxels in each respective data set (vessel group and filter).

After the correlation value is computed, the perivascular nodule candidates are separated from non-candidates by thresholding. The threshold value was empirically determined to be in the range 50%-80%, such that ranges of 50%-100% to 80% to 100% would indicate a match between the filter shape and the target candidate. As with the number of morphological filters, lowering the correlation value threshold increases not only the sensitivity but also the computation time and the number of false positives. As such, a design trade-off exists whose resolution is within the skill of an ordinary artisan. After this matching process, region growing and labeling are once again applied to the remaining nodule candidates with each nodule candidates shape and geometric features (e.g. volume) being computed. Thereafter, the nodule candidates are processed at step 116 as described above wherein each candidate structure's nodule status is determined on the basis of the above-described geometric criteria.

FIG. 5 depicts examples of detected nodules using the present invention and the original transaxial CT images. FIG. 5(B) shows both a perivascular nodule (arrow) and an isolated nodule (arrow head) that are detected by the present invention within the CT image of FIG. 5(A) for subject 5. FIG. 5(D) shows two pleural nodules (arrows) detected within the CT image of FIG. 5(C). No false negative or false positive modules are detected.

FIGS. 6(A) and (B) depict a 3D volume rendering of multiple detected nodules together with a pulmonary vessel (6(A) being an anterior view and 6(B) being a posterior view) for subject 15. The detected nodules are identified by arrows. Subject 15 has a total of 13 nodules, 7 isolated, 3 pleural, and 3 perivascular). Two false positives were identified.

Overall, the sensitivity for nodule detection in testing of the preferred embodiment, by nodule category, was 97.4% for isolated nodules ($^{76}/_{78}$), 92.3% for pleural nodules ($^{48}/_{52}$), and 94.1% for perivascular nodules ($^{32}/_{34}$). The sensitivity of detection by nodule size was 92.6% for nodules greater than or equal to 10 mm ($^{25}/_{27}$), 98.8% for nodules 5-10 mm ($^{79}/_{80}$), and 91.2% for 3-5 mm nodules ($^{52}/_{57}$).

FIG. 7 plots a comparison of the number of nodules detected by the preferred embodiment and by a chest radiologist. The false positives per patient was 6.9 (or 0.84/true nodule) for all nodules greater than or equal to 3 mm and 4.0 (or 0.67/nodule) for nodules greater than or equal to 5 mm. Nearly all of the false positives were less than 5 mm. As can be seen from FIG. 7, lung nodule detection by the preferred embodiment was highly accurate for the 20 test subjects and better than the radiologist's first reading without CAD. The processing time in one software implementation was 20 minutes. However, the present inventors envision that this processing time can be reduced through improvements in software coding.

The preferred slice thickness and reconstruction interval for the CT slices is 1 mm or less. However, it should be noted that the algorithm can accommodate different slice thicknesses and/or different reconstruction intervals. The slice thickness and reconstruction interval of a CT scan can be obtained from the header of the images. After the boundary of the lung region is refined as described above in connection with FIG. 2, the 2D segmented lung regions can be stacked to generate a 3D volumetric data set of the lung region. If the reconstruction interval is larger than 1 mm, finer-resolution slices can be interpolated at every 1 mm using the slice neighboring above and the slice neighboring below and integrated into the expanded 3D volumetric dataset.

The reconstruction interval information can also be used in the process of evaluating the nodule status of nodule candidates to adjust the parameters for geometric criteria such as elongation factor and compactness. If the reconstruction interval is greater than or equal to 3 mm, candidate structures were compared first against the 2D elongation factor and any surviving candidates can be compared against the 3D elongation factor. In this process, the upper limit of the 3D elongation factor is preferably increased to 5, while the 2D elongation factor remains at 3. The compactness in this scenario is also preferably increased to 2, when the reconstruction interval is greater than or equal to 3 mm.

As previously noted, the algorithm can be applied to target structures other than pulmonary nodules. For example, the algorithm can be used to detect colon polyps. FIG. 8 is a flowchart depicting an embodiment of the algorithm directed toward detecting colon polyps.

The colonic polyp detection algorithm of the present invention is a combination of 2D and 3D operations. While the 3D operation is more general and more powerful, in some image processing steps the 2D operation is preferred because it is more efficient and easier to implement. The combined 2D/3D approach of the colon polyp detection algorithm represents an efficient technique for colonic polyp detection and may be used by radiologists when medical images such as CT images are reviewed for the presence of colonic polyps. Furthermore, CT images with a fine slice thickness and a fine reconstruction interval may result in voxels that are isotropic or near isotropic. In such a case, the 2D operation may be performed in any direction either on the original transverse slices or on reformatted sagittal or coronal slices.

The colon is an air-filled structure, and as such, its representation in CT image slices 800 can be easily identified from its surrounding soft tissues or bony tissues. Gray-level thresholding methods which, which are known in the art as mentioned in connection with FIG. 2, can be used to create binary images and thereafter to detect the boundary of the abdomen/pelvis and colon in the abdominal/pelvic CT (step 802). There are, however, other air-filled structures in the abdominal/pelvic CT such as the lung bases, stomach, and small intestine.

At step 804, all air-filled structures are identified by a gray-level thresholding method and segmented therefrom (, and thereafter the colon is preferably separated from other structures based on its anatomical location, size, and regional contiguity from the rectum. The rectum is the most caudal air-filled structure in the body and can be unequivocally identified. The colon, which is connected to the rectum, is subsequently segmented at step 804 by means of a topologic continuity constraint that is known in the art.

A completely segmented colon should include, starting from the rectum, the sigmoid, left, transverse, and right colon. The anatomical location of the segmented colonic regions is preferably evaluated and used as a constraint to ensure the segmentation of the entire colon. If this constraint is not satisfied, the segmented result is preferably displayed and the operator is asked to revise it so that a completely segmented the boundary of the colon can be generated.

The detected colon boundary corresponds to the boundary between the air within the colon and the soft-tissue structures surrounding the colonic lumen. The soft-tissue structures constitute the colon walls, haustral folds, and polyps (if there is a polyp). With the detected boundary as a starting point, the colonic soft-tissue structures are preferably segmented at step 806 by means of a region-growing method such as a morphological operation. A preferred morphological operation comprises applying iteratively circular "closing" filters of variable diameters to the segmented colon boundary to capture the polyps and other soft-tissue structures. The region-growing method essentially expands the detected colonic boundary outward to include polyps and other soft-tissue structures surrounding the colon lumen. Instead of the 2D region-growing method, a 3D region-growing method may be applied to segment the colonic soft-tissue structures. While the 3D operation is more general and more powerful, the 2D operation tends to be more efficient and easier to implement.

The size of the morphological filtering affects the quality of the 3D dataset of the segmented colonic soft-tissue structures. With a small size for the filtering, the size of the 3D dataset will be small, but more specific in that it will include small structures immediately adjacent to the colonic lumen. With a larger size for the filtering, the size of the 3D dataset will be larger, including more folds and structures deeper into the colonic wall. The 3D datasets obtained by applying different sizes of the morphologic filters are preferably geometrically subtracted or regrouped to generate different candidate sets (step 808).

At step 810, each grouped structure in the data set is classified or labeled as either part of a first data classification or a second data classification. The first classification preferably encompasses grouped structures containing isolated polyp candidates, colonic folds, and colonic walls. The second classification preferably encompasses grouped structures containing polyp candidates that are attached to colonic folds or colonic walls.

The structures labelled with the first classification are preferably grouped at step 812 prior to the application of polyp status evaluation at step 818. The structures labelled with the second classification are grouped at step 814 prior to undergoing a different polyp status determination operation at step 816.

At step 818, the polyps are preferably classified from the candidate sets based on the size, compactness, elongation factor, and a voxel intensity data for the candidate sets. The voxel intensity data is an indicator for the tissue composition of the image portion, as is known in the art. A variety of types of intensity data can be used in the practice of the algorithm, including statistical measures such as a mean intensity value, an attenuation distribution, a minimum intensity value, and/or a maximum intensity value. Any candidate structures that are not classified as polyps (822) or non-polyps (820) at step 818 are preferably processed by means of a 3D multi-level morphological matching method (step 816). This method is similar to that used for the lung nodule classification. For the colon polyp classification, 3D multi-level morphological matching method enhances the identification and extraction of polyp candidates that are attached to the colonic folds or walls.

After this matching process, region growing and labeling were once again applied to the remaining polyp candidates with each polyp candidates shape and geometric features being computed at step 818.

While the present invention has been described above in relation to its preferred embodiment, various modifications may be made thereto that still fall within the invention's scope, as would be recognized by those of ordinary skill in the art. Such modifications to the invention will be recognizable upon review of the teachings herein. Accordingly, the full scope of the present invention is to be defined solely by the appended claims and their legal equivalents.

What is claimed is:

1. A device for detecting whether pulmonary nodules are present in a patient's lung region from a three-dimensional (3D) data set representative of a volumetric image of the patient's lung region, the device comprising:
a processor configured to (1) identify contiguous structures in the 3D data set, (2) classify the identified contiguous structures according to a plurality of classifications, the classifications comprising a vessel contiguous structure classification and a non-vessel contiguous structure classification, wherein each non-vessel contiguous structure comprises a nodule candidate, (3) apply a first nodule detection operation to each vessel contiguous structure to determine a nodule status therefor, and (4) apply a second nodule detection operation to each non-vessel contiguous structure to determine a nodule status therefor, wherein the first nodule detection operation is different than the second nodule detection algorithm;
wherein the processor is further configured to apply the first nodule detection operation by (1) segmenting nodule candidate structures from surrounding vessel structures through a correlation of each vessel contiguous structure with a 3D morphological filter, and (2) determining a nodule status for each segmented nodule candidate;
wherein the processor is further configured to apply the second nodule detection operation by determining a nodule status for each non-vessel nodule candidate at least partially on the basis of geometric criteria;
wherein the processor is further configured to determine the nodule status for each non-vessel nodule candidate by comparing each nodule candidate with a compactness criteria; and
wherein the processor is further configured to compare each non-vessel nodule candidate with the compactness criteria by:
for each non-vessel nodule candidate, (1) determining a volume of that non-vessel nodule candidate, (2) determining a volume of the smallest 3D box that encloses that non-vessel nodule candidate, and (3) computing a ratio of the determined non-vessel nodule candidate volume to the determined box volume; and
for each non-vessel nodule candidate having a determined volume ratio less than approximately 0.5 or greater than approximately 1.5, determining that that non-vessel nodule candidate is not a pulmonary nodule.

2. The device of claim 1 wherein the processor is further configured to perform the correlation by convolving each vessel contiguous structure with a 3D morphological filter.

3. The device of claim 2 wherein the processor is further configured to perform the correlation by convolving each vessel contiguous structure with a plurality of 3D morphological filters.

4. The device of claim 3 wherein the filters comprise a plurality of spherical filters, each filter being tuned with a different diameter.

5. The device of claim 3 wherein the processor is further configured to determine nodule status for the segmented nodule candidates by determining a nodule status for each nodule candidate at least partially on the basis of geometric criteria.

6. The device of claim 5 wherein the geometric criteria includes size.

7. The device of claim 5 wherein the geometric criteria includes compactness.

8. The device of claim 5 wherein the geometric criteria includes elongation.

9. The device of claim 5 wherein the geometric criteria includes size, compactness, and elongation.

10. The device of claim 3 wherein the processor is further configured to perform the segmentation by determining that a nodule candidate exists if the correlation results in a correlation within a predetermined range of correlation values.

11. The device of claim 1 wherein the processor is further configured to determine the nodule status for each non-vessel nodule candidate by comparing each nodule candidate with a size criteria.

12. The device of claim 11 wherein the size criteria is diameter.

13. The device of claim 1 wherein the processor is further configured to determine the nodule status for each non-vessel nodule candidate by comparing each nodule candidate with an elongation criteria.

14. The device of claim 13 wherein the processor is further configured to compare each non-vessel nodule candidate with an elongation criteria by comparing each non-vessel nodule candidate with a two-dimensional (2D) elongation criteria and a 3D elongation criteria.

15. The device of claim 14 wherein the processor is further configured to compare each non-vessel nodule candidate with an elongation criteria by comparing a non-vessel nodule candidate with the 3D elongation criteria only if that non-vessel nodule candidate satisfies the 2D elongation criteria.

16. The device of claim 1 wherein the processor is further configured to determine a nodule status for each non-vessel nodule candidate by comparing each nodule candidate with a size criteria, a compactness criteria, and an elongation criteria.

17. The device of claim 1 wherein the processor is further configured to generate the 3D data set from a plurality of 2D image slices of the patient's lung region.

18. The device of claim 17 wherein the 2D image slices comprise a plurality of computed tomography slices.

19. The device of claim 17 wherein the 2D image slices comprise a plurality of magnetic resonance slices.

20. The device of claim 17 wherein the 2D image slices comprise a plurality of ultrasound slices.

21. A device for detecting whether pulmonary nodules are present in a patient's lung region from a three-dimensional (3D) data set representative of a volumetric image of the patient's lung region, the device comprising:
a processor configured to (1) identify contiguous structures in the 3D data set, (2) classify the identified contiguous structures according to a plurality of classifications, the classifications comprising a vessel contiguous structure classification and a non-vessel contiguous structure classification, wherein each non-vessel contiguous structure comprises a nodule candidate, (3) apply a first nodule detection operation to each vessel contiguous structure to determine a nodule status therefor, and (4) apply a second nodule detection operation to each non-vessel contiguous structure to determine a nodule status therefor, wherein the first nodule detection operation is different than the second nodule detection algorithm;
wherein the processor is further configured to apply the first nodule detection operation by (1) segmenting nodule candidate structures from surrounding vessel structures through a correlation of each vessel contiguous structure with a 3D morphological filter, and (2) determining a nodule status for each segmented nodule candidate;
wherein the processor is further configured to apply the second nodule detection operation by determining a nodule status for each non-vessel nodule candidate at least partially on the basis of geometric criteria;
wherein the processor is further configured to determine the nodule status for each non-vessel nodule candidate by comparing each nodule candidate with an elongation criteria; and
wherein the processor is further configured to compare each non-vessel nodule candidate with the elongation criteria by:
for each non-vessel nodule candidate, (1) determining a length of a major axis of the smallest rectangle or ellipse that encloses that non-vessel nodule candidate, (2) determining a length of a minor axis of the smallest rectangle or ellipse that encloses that non-vessel nodule candidate, (3) computing a ratio of the major axis length to the minor axis length; and
for each non-vessel nodule candidate having a determined elongation axis ratio greater than approximately 3.0, determining that that non-vessel nodule candidate is not a pulmonary nodule.

22. The device of claim 21 wherein the processor is further configured to perform the correlation by convolving each vessel contiguous structure with a 3D morphological filter.

23. The device of claim 22 wherein the processor is further configured to perform the correlation by convolving each vessel contiguous structure with a plurality of 3D morphological filters.

24. The device of claim 23 wherein the filters comprise a plurality of spherical filters, each filter being tuned with a different diameter.

25. The device of claim 23 wherein the processor is further configured to determine nodule status for the segmented nodule candidates by determining a nodule status for each nodule candidate at least partially on the basis of geometric criteria.

26. The device of claim 25 wherein the geometric criteria includes size.

27. The device of claim 25 wherein the geometric criteria includes compactness.

28. The device of claim 25 wherein the geometric criteria includes size, compactness, and elongation.

29. The device of claim 23 wherein the processor is further configured to perform the segmentation by determining that a nodule candidate exists if the correlation results in a correlation within a predetermined range of correlation values.

30. The device of claim 21 wherein the processor is further configured to determine the nodule status for each non-vessel nodule candidate by comparing each nodule candidate with a size criteria.

31. The device of claim 30 wherein the size criteria is diameter.

32. The device of claim 21 wherein the processor is further configured to determine the nodule status for each non-vessel nodule candidate by comparing each nodule candidate with the elongation criteria.

33. The device of claim 32 wherein the processor is further configured to compare each non-vessel nodule candidate with an elongation criteria by comparing each non-vessel nodule candidate with a two-dimensional (2D) elongation criteria and a 3D elongation criteria.

34. The device of claim 33 wherein the processor is further configured to compare each non-vessel nodule candidate with an elongation criteria by comparing a non-vessel nodule candidate with the 3D elongation criteria only if that non-vessel nodule candidate satisfies the 2D elongation criteria.

35. The device of claim 21 wherein the processor is further configured to generate the 3D data set from a plurality of 2D image slices of the patient's lung region.

36. The device of claim 35 wherein the 2D image slices comprise a plurality of computed tomography slices.

37. The device of claim 35 wherein the 2D image slices comprise a plurality of magnetic resonance slices.

38. The device of claim 35 wherein the 2D image slices comprise a plurality of ultrasound slices.

39. A device for detecting whether pulmonary nodules are present in a patient's lung region from a three-dimensional (3D) data set representative of a volumetric image of the patient's lung region, the device comprising:
a processor configured to (1) identify contiguous structures in the 3D data set, (2) classify the identified contiguous structures according to a plurality of classifications, the classifications comprising a vessel contiguous structure classification and a non-vessel contiguous structure classification, wherein each non-vessel contiguous structure comprises a nodule candidate, (3) apply a first nodule detection operation to each vessel contiguous structure to determine a nodule status therefor, and (4) apply a second nodule detection operation to each non-vessel contiguous structure to determine a nodule status therefor, wherein the first nodule detection operation is different than the second nodule detection algorithm;

wherein the processor is further configured to apply the first nodule detection operation by (1) segmenting nodule candidate structures from surrounding vessel structures through a correlation of each vessel contiguous structure with a 3D morphological filter, and (2) determining a nodule status for each segmented nodule candidate wherein the processor is further configured to apply the second nodule detection operation by determining a nodule status for each non-vessel nodule candidate at least partially on the basis of geometric criteria;

wherein the processor is further configured to determine the nodule status for each non-vessel nodule candidate by comparing each nodule candidate with an elongation criteria; and wherein the processor is further configured to compare each non-vessel nodule candidate with the elongation criteria by:
  for each non-vessel nodule candidate, (1) determining a maximum eigenvalue from coordinates of the voxels of that non-vessel nodule candidate, (2) determining a minimum eigenvalue from coordinates of the voxels of that non-vessel nodule candidate, (3) computing a ratio of the maximum eigenvalue to the minimum eigenvalue; and
  for each non-vessel nodule candidate having a determined elongation eigenvalue ratio greater than approximately 3.0, determining that that non-vessel nodule candidate is not a pulmonary nodule.

40. The device of claim 39 wherein the processor is further configured to perform the correlation by convolving each vessel contiguous structure with a 3D morphological filter.

41. The device of claim 40 wherein the processor is further configured to perform the correlation by convolving each vessel contiguous structure with a plurality of 3D morphological filters.

42. The device of claim 41 wherein the filters comprise a plurality of spherical filters, each filter being tuned with a different diameter.

43. The device of claim 41 wherein the processor is further configured to determine nodule status for the segmented nodule candidates by determining a nodule status for each nodule candidate at least partially on the basis of geometric criteria.

44. The device of claim 43 wherein the geometric criteria includes size.

45. The device of claim 43 wherein the geometric criteria includes compactness.

46. The device of claim 43 wherein the geometric criteria includes size, compactness, and elongation.

47. The device of claim 41 wherein the processor is further configured to perform the segmentation by determining that a nodule candidate exists if the correlation results in a correlation within a predetermined range of correlation values.

48. The device of claim 39 wherein the processor is further configured to determine the nodule status for each non-vessel nodule candidate by comparing each nodule candidate with a size criteria.

49. The device of claim 48 wherein the size criteria is diameter.

50. The device of claim 39 wherein the processor is further configured to determine the nodule status for each non-vessel nodule candidate by comparing each nodule candidate with the elongation criteria.

51. The device of claim 50 wherein the processor is further configured to compare each non-vessel nodule candidate with an elongation criteria by comparing each non-vessel nodule candidate with a two-dimensional (2D) elongation criteria and a 3D elongation criteria.

52. The device of claim 51 wherein the processor is further configured to compare each non-vessel nodule candidate with an elongation criteria by comparing a non-vessel nodule candidate with the 3D elongation criteria only if that non-vessel nodule candidate satisfies the 2D elongation criteria.

53. The device of claim 39 wherein the processor is further configured to generate the 3D data set from a plurality of 2D image slices of the patient's lung region.

54. The device of claim 53 wherein the 2D image slices comprise a plurality of computed tomography slices.

55. The device of claim 53 wherein the 2D image slices comprise a plurality of magnetic resonance slices.

56. The device of claim 53 wherein the 2D image slices comprise a plurality of ultrasound slices.

57. A device for analyzing a 3D data set representative of a patient's lung region, the device comprising:
  a processor configured to (1) group the data set into data subsets, each subset being representative of a contiguous structure, (2) identify each data subset that corresponds to a vessel, and (3) segment any perivascular nodule candidates from each identified subset by correlating that identified subset with at least one 3D morphological filter that is tuned to an expected shape of a perivascular nodule;
  wherein the processor is further configured to perform the correlation by convolving each identified subset with the at least one filter to thereby compute a correlation value; and
  wherein the processor is further configured to perform the convolution by computing the correlation value between the identified subset (I) and the filter (F) by a Fast Fourier Transform (FFT) according to the formula:

$$(I * F)(t) = \sum I(t) \cdot F(x-t) = \frac{1}{n_i n_f} \sum_{x=0}^{n-1} I(u_i) \cdot \exp(2\pi i u_i x / n_i) \cdot F(u_f) \cdot \exp(2\pi i u_f (t-x) / n_f)$$

wherein $u_i$ is a value of an $i^{th}$ voxel in I, wherein $u_f$ is a value of an $f^{th}$ voxel in F, wherein $n_i$ is a value for a total number of voxels in I, and wherein $n_f$ is a value for a total number of voxels in F.

58. The device of claim 57 wherein the processor is configured to perform the correlation by correlating each identified subset with a plurality of 3D morphological filters, each filter being tuned to a different expected shape of a perivascular nodule.

59. The device of claim 58 wherein at least one filter is a spherical filter tuned with a predetermined diameter.

60. The device of claim 59 wherein the predetermined diameter is approximately 3 mm.

61. The device of claim 58 wherein a plurality of the filters are spherical filters, each spherical filter being tuned with a different predetermined diameter.

62. The device of claim 58 wherein the processor is further configured to perform the correlation by performing the correlations in parallel, each parallel correlation being configured to correlate an identified subset with one of the filters.

63. The device of claim 57 wherein the processor is further configured to perform the segmentation by determining whether a perivascular nodule candidate exists at least partially according to the computed correlation value.

64. The device of claim 63 wherein the processor is further configured to determine whether a perivascular nodule candidate exists by determining that a perivascular nodule candidate does exist if the computed correlation value lies within a predetermined range of correlation values.

65. The device of claim 57 wherein the processor is further configured to, for each segmented perivascular nodule candidate, determine a nodule status therefor at least partially on the basis of geometric criteria.

66. The device of claim 65 wherein the geometric criteria comprises at least one selected from the group consisting of candidate size, candidate compactness, and candidate elongation.

67. The device of claim 57 wherein the processor is further configured to generate the 3D data set from one selected from the group consisting of a plurality of computed tomography (CT) slices, a plurality of magnetic resonance (MR) slices, and a plurality of ultrasound slices.

68. The device of claim 57 wherein the processor is further configured to (1) identify each data subset that corresponds to a non-vessel, and (2) for each subset identified as corresponding to a non-vessel, determine a nodule status therefor at least partially on the basis of geometric criteria.

* * * * *